United States Patent
Han et al.

(10) Patent No.: US 11,164,546 B2
(45) Date of Patent: *Nov. 2, 2021

(54) HMD DEVICE AND METHOD FOR CONTROLLING SAME

(71) Applicant: SAMSUNG ELECTRONICS CO., LTD., Suwon-si (KR)

(72) Inventors: Seong-won Han, Seoul (KR); Woo-jin Park, Yongin-si (KR); Dae-hyun Ban, Seoul (KR); Sangsoon Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,412

(22) Filed: Apr. 1, 2020

(65) Prior Publication Data

US 2020/0227009 A1 Jul. 16, 2020

Related U.S. Application Data

(63) Continuation of application No. 15/781,346, filed as application No. PCT/KR2016/002724 on Mar. 17, 2016, now Pat. No. 10,643,579.

(30) Foreign Application Priority Data

Jan. 20, 2016 (KR) .................. 10-2016-0007086

(51) Int. Cl.
*G09G 5/37* (2006.01)
*G06T 11/60* (2006.01)
(Continued)

(52) U.S. Cl.
CPC ............. *G09G 5/377* (2013.01); *G02B 27/01* (2013.01); *G06F 3/01* (2013.01); *G06F 3/017* (2013.01);
(Continued)

(58) Field of Classification Search
CPC combination set(s) only.
See application file for complete search history.

(56) References Cited

U.S. PATENT DOCUMENTS

| 7,952,594 B2 * | 5/2011 | Morita ................ G02B 27/017 345/633 |
| 8,228,315 B1 | 7/2012 | Starner et al. |

(Continued)

FOREIGN PATENT DOCUMENTS

| CN | 102884490 | 1/2013 |
| CN | 103984097 | 8/2014 |

(Continued)

OTHER PUBLICATIONS

First Office Action dated Jun. 3, 2020 in counterpart Chinese Patent Application No. 201680079475.1 and English-language translation.
(Continued)

*Primary Examiner* — Wesner Sajous
(74) *Attorney, Agent, or Firm* — Nixon & Vanderhye, P.C.

(57) ABSTRACT

An example head mounted display (HMD) device includes a display for displaying a content; a detection unit for detecting the movement of the object in front of the HMD device; and a processor for changing, on the basis of the location of the object, a screen state of the display to provide image of the front of the HMD device, when the movement of the object is detected.

18 Claims, 19 Drawing Sheets

(51) Int. Cl.
  *G06T 19/00* (2011.01)
  *G06F 3/01* (2006.01)
  *G09G 5/377* (2006.01)
  *G02B 27/01* (2006.01)

(52) U.S. Cl.
  CPC ............ *G06T 11/60* (2013.01); *G06T 19/006* (2013.01); *G06F 3/013* (2013.01); *G09G 2340/12* (2013.01); *G09G 2354/00* (2013.01)

(56) References Cited

U.S. PATENT DOCUMENTS

| | | | |
|---|---|---|---|
| 8,482,527 | B1 | 7/2013 | Kim |
| 8,558,759 | B1 | 10/2013 | Prada Gomez et al. |
| 9,081,181 | B2 | 7/2015 | Lee |
| 9,213,185 | B1* | 12/2015 | Starner ................ G02B 27/017 |
| 9,411,160 | B2 | 8/2016 | Hosoya |
| 9,448,624 | B2 | 9/2016 | Kim |
| 9,529,442 | B2 | 12/2016 | Cho et al. |
| 10,065,503 | B2 | 9/2018 | Tauchi et al. |
| 10,800,258 | B2 | 10/2020 | Tauchi et al. |
| 2012/0050143 | A1* | 3/2012 | Border ................ G09G 3/3611 345/8 |
| 2012/0068913 | A1* | 3/2012 | Bar-Zeev ........... G02B 27/0172 345/8 |
| 2012/0249587 | A1 | 10/2012 | Anderson et al. |
| 2012/0293407 | A1 | 11/2012 | Lee |
| 2013/0328928 | A1 | 12/2013 | Yamagishi et al. |
| 2014/0043213 | A1 | 2/2014 | Park et al. |
| 2014/0078043 | A1 | 3/2014 | Kim |
| 2014/0139404 | A1 | 5/2014 | Takeda et al. |
| 2014/0191946 | A1 | 7/2014 | Cho et al. |
| 2014/0225812 | A1 | 8/2014 | Hosoya |
| 2014/0320383 | A1* | 10/2014 | Goto ........................ G06F 3/041 345/8 |
| 2014/0320399 | A1 | 10/2014 | Kim et al. |
| 2014/0368539 | A1 | 12/2014 | Yeh |
| 2015/0002394 | A1 | 1/2015 | Cho et al. |
| 2015/0062163 | A1 | 3/2015 | Lee et al. |
| 2015/0123997 | A1* | 5/2015 | Hayasaka .......... G02B 27/0101 345/633 |
| 2015/0235632 | A1 | 8/2015 | Liu et al. |
| 2015/0243079 | A1 | 8/2015 | Cho et al. |
| 2017/0106750 | A1 | 4/2017 | Tauchi et al. |
| 2017/0200296 | A1* | 7/2017 | Jones ..................... G06F 40/58 |
| 2018/0354365 | A1 | 12/2018 | Tauchi et al. |

FOREIGN PATENT DOCUMENTS

| | | |
|---|---|---|
| CN | 105026983 | 11/2015 |
| JP | 2015-100032 | 5/2015 |
| KR | 10-2012-0129134 | 11/2012 |
| KR | 10-2014-0129936 | 11/2014 |
| KR | 10-2015-0006128 | 1/2015 |
| KR | 10-2015-0054825 | 5/2015 |
| KR | 10-2015-0104338 | 9/2015 |
| WO | 2011/109126 | 9/2011 |
| WO | 2015/151500 | 10/2015 |

OTHER PUBLICATIONS

Communication pursuant to Article 94(3) EPC dated Jun. 16, 2020 in counterpart European Patent Application No. 16886584.8.
International Search Report for PCT/KR2016/002724, dated Sep. 12, 2016, 4 pages.
Written Opinion of the ISA for PCT/KR2016/002724 with English translation, dated Sep. 12, 2016, 11 pages.
Extended Search Report dated Oct. 30, 2018 in counterpart EP Application No. 16 886 584.8.
Communication pursuant to Article 94(3) EPC dated Mar. 26, 2019 in counterpart EP Application No. 16 886 584.8.
Communication pursuant to Article 94(3) EPC dated Nov. 4, 2019 in counterpart EP Application No. 16 886 584.8.
Han et al., U.S. Appl. No. 15/781,346, filed Jun. 4, 2018.
Communication pursuant to Article 94(3) EPC dated Nov. 4, 2020 in counterpart European Patent Application No. 16886584.8.
Second Office Action dated Dec. 24, 2020 in counterpart Chinese Patent Application No. 201680079475.1 and English-language translation.
Examination Report dated Aug. 24, 2021 issued in counterpart Indian Patent Application No. 201817024907 and English-language translation.

\* cited by examiner

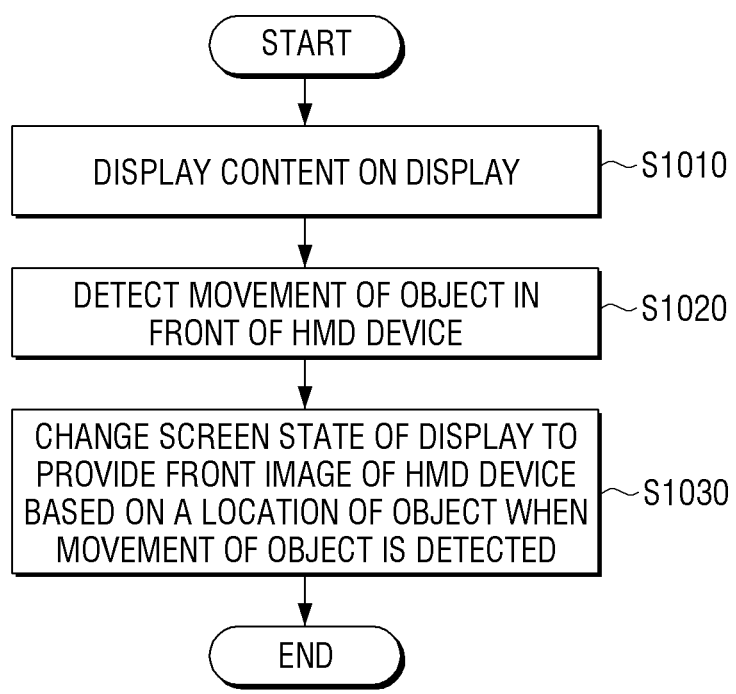

HMD DEVICE AND METHOD FOR CONTROLLING SAME

CROSS-REFERENCE TO RELATED APPLICATIONS

This application is a continuation of U.S. application Ser. No. 15/781,346, filed on Jun. 4, 2018, now U.S. Pat. No. 10,643,579, which is a national stage application of International Patent Application No. PCT/KR2016/002724, filed on Mar. 17, 2016, which designates the United States, and which claims priority to Korean Patent Application No. 10-2016-0007086, filed Jan. 20, 2016. The contents of each of these applications are incorporated herein in their entirety.

BACKGROUND

Technical Field

The disclosure relates to a head mounted display (HMD) device and a method for controlling the same, and more particularly, to an HMD device configured to provide virtual reality service and a method for controlling the same.

Background Art

Strengthened with development of the electronic technology, various types of electronic products are developed and supplied, and head mounted display (HMD) devices are used, providing virtual reality services.

In general, the virtual reality technology collectively refers to those technologies that essentially aim to recreate three-dimensional virtual space for the participants so that they can be immersed in the virtually-created world by means of an interaction through all human senses (vision, hearing, smell, taste, touch) in a three-dimensional virtual environment which is created through the computer graphics (CG) technology similarly to a real environment, and also to allow the human user to be immersed in this virtual space and maximize utilization of information.

Meanwhile, in a related art, a user may have difficulty of managing emergent situation when the user is immersed in the virtual space and not able to recognize situation occurring outside. Further, the user may have difficulty of understanding an external environment or using external interface (e.g., keyboard, mouse, or the like) without taking off the HMD device when such is required.

Although some HMD devices recognize an external object and express this in augmented reality, there are inconveniences in that only registered external objects are expressed, or expression is not satisfactory, or delay time occurs.

Accordingly, a technology for the user to recognize an exterior of the HMD device with more convenient method is demanded.

SUMMARY

Accordingly, an object of the present disclosure is to provide an HMD device configured to change a screen state of the certain area of a display included in the HMD device and a method for controlling the same.

In order to accomplish the above-mentioned object, the present disclosure provides a head mounted display (HMD) device including a display configured to display content, a detection unit configured to detect movement of an object in front of the HMD device, and a processor configured to change a screen state of the display and provide front image of the HMD device based on the location of the object when movement of the object is detected.

Further, the detection unit may include a camera and the processor may overlay an image among images photographed by the camera that corresponds to location at which the movement of the object is detected, on a corresponding area of the display.

Further, the processor may determine relative movement of the object with respect to movement of the HMD device when the movement of the HMD device is detected, and change the screen state to provide front image of the HMD device based on relative movement of the object.

Further, the processor may change the screen state to provide front image of the HMD device based on the location of the object when size of the detected object is greater than a preset size.

Further, the processor may change the screen state to provide front image of the HMD device based on the user gesture when movement of the object is a user gesture in a preset form.

Further, the processor may change the screen state to provide front image of the HMD device when user gesture directing toward a preset direction is detected, and change the screen state so as not to provide front image of the HMD device when user gesture directing toward an opposite direction is detected in the changed screen state.

Further, the detection unit may detect a user gaze, and the processor may maintain the changed screen state when the user gaze is placed on the certain area of the display in which the screen state has been changed, and change the screen state so as not to provide front image of the HMD device when the user gaze is outside the certain area of the display.

Further, the processor may change transparency of the certain area of the display based on the location of the object when movement of the object is detected.

Further, the processor may change transparency of the certain area of the display based on current transparency of a certain area of the display when movement of the object is detected.

The HMD device may further include a storage configured to store mapping information of an object in a preset form and corresponding movement, and the processor may determine a certain area of the display for which transparency is to be changed and degree of change in the transparency based on the mapping information.

Meanwhile, according to an embodiment, a method for controlling a head mounted display (HMD) device may include displaying content on a display, detecting movement of an object in front of the HMD device, and changing a screen state of the display to provide front image of the HMD device based on the location of the object when movement of the object is detected.

Further, the changing may include overlay and display image among images photographed by the camera corresponding to position where movement of the object is detected on a corresponding area of the display.

Further, the changing may include determining relative movement of the object with respect to movement of the HMD device when movement of the HMD device is detected, and changing the screen state to provide front image of the HMD device based on relative movement of the object.

Further, the changing may include changing the screen state to provide front image of the HMD device based on the location of the object when size of the detected object is greater than a preset size.

Further, the changing may include changing the screen state to provide front image of the HMD device based on the user gesture when movement of the object is a user gesture in a preset form.

Further, the changing may include changing the screen state to provide front image of the HMD device when user gesture directing toward a preset direction is detected, and changing the screen state so as not to provide front image of the HMD device when user gesture directing toward an opposite direction is detected in the changed screen state.

Further, the method may include detecting a user gaze, maintaining the changed screen state when the user gaze is placed on the certain area of the display in which the screen state has been changed, and changing the screen state so as not to provide front image of the HMD device when the user gaze is outside the certain area of the display.

Further, the changing may include changing transparency of the certain area of the display based on the location of the object when movement of the object is detected.

Further, the changing may include changing transparency of a certain area of the display based on current transparency of the certain area of the display when movement of the object is detected.

Further, the changing may include determining the certain area of the display for which transparency is to be changed and degree of change in the transparency, based on mapping information of an object in a preset form and corresponding movement.

According to the above various embodiments, a screen state of a certain area of the display provided on the HMD device is changed according to movement of an object in front of the HMD device, and therefore, the user is able to view a front direction of the HMD device.

BRIEF DESCRIPTION OF THE DRAWINGS

The above and/or other aspects and advantages of the present disclosure will become apparent and more readily appreciated from the following detailed description, taken in conjunction with the accompanying drawings, in which:

FIG. 10 is a flowchart provided to describe a method for controlling an HMD device according to an embodiment of the disclosure.

DETAILED DESCRIPTION OF EXAMPLE EMBODIMENTS

Hereinbelow, various embodiments of the present disclosure will be explained with reference to the drawings. The specification of the present disclosure may not limit the scope of the disclosure to be specific embodiments. Rather, it should be construed that various modifications, equivalents and/or alternatives are included. Similar constituent elements are allowed with a same or similar reference number with respect to description of drawings.

Further, expressions of the present disclosure used herein such as "first," "second," or the like are used to distinguish various constituent elements from each other regardless of order or importance. Accordingly, such expressions may not limit order or importance of corresponding constituent elements. For example, a first constituent element may be named as a second constituent element without departing from the scope of the present disclosure, and similarly, a second constituent element may be changed and named as a first constituent element.

Further, when one constituent element (e.g., first constituent element) is stated as being operatively or communicatively coupled with or connected to another constituent element (e.g., second constituent element) in the present disclosure, it should be construed as encompassing both direct coupling of each constituent element and indirect coupling via another constituent element (e.g., third constituent element). Meanwhile, when one constituent element (e.g., first constituent element) is stated as being "directly coupled with" or "directly connected to" another constituent element (e.g., second constituent element), it may be construed that yet another constituent element (e.g., third constituent element) is not present between one constituent element and another constituent element.

Terms used in the present disclosure are used to describe a certain embodiment and may not intend to limit the scope of other embodiments. Further, the present disclosure may use singular expression for convenience of explanation; but may be interpreted as encompassing plural expression unless it clearly indicates to the contrary. Further, terms used in the present disclosure may have the same meaning as that generally understood by a person skilled in the art. Terms defined in dictionaries among the terms of the present disclosure may be interpreted as the same or similar meaning to that indicated by context of a related technology. Further, unless it is clearly defined in the present disclosure, it may not be interpreted as ideal or overly formal meaning. In certain cases, even when terms are defined in the present disclosure, they may not be interpreted as excluding embodiments of the present disclosure.

The following will specifically explain various embodiments of the present disclosure with reference to attached drawings.

Figure 1:
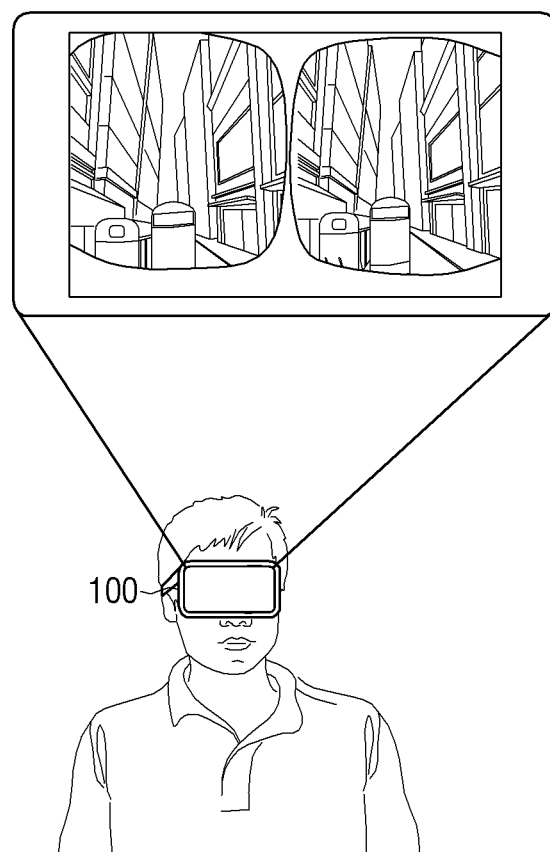
FIG. 1 is a diagram illustrating an HMD device according to an embodiment of the disclosure.

FIG. 1 is a diagram illustrating an HMD device 100 according to an embodiment of the disclosure.

As illustrated in FIG. 1, the head mounted display (HMD) device 100 may be worn on the user head to provide virtual reality service. For example, the HMD device 100 may have a shape of glasses, headset, helmet or the like and provide images to both eyes of the user.

For example, the HMD device 100 may provide images in front of the eyes of the user by displaying images through a display. In this case, temples of the glasses or band may be formed on a rear side of the HMD device 100, allowing the user to wear the same on his/her head. Further, the HMD device 100 may be mounted with a manipulation track pad, a return button, a volume adjust key, or the like.

Alternatively, the HMD device 100 may be implemented as a device requiring a separate display. For example, the HMD device 100 may be a main body (e.g., housing) in a form of glasses, headset, helmet or the like, and provide images to both eyes of the user as a smart phone, a tablet or the like is mounted in front of the main body.

Meanwhile, when the user wears the HMD device 100 on the head, an area viewed with the left eye of the user and an area viewed with the right eye may be separated in spatially. Accordingly, the HMD device 100 may display different images from each other on an area viewed with the left eye of the user and an area viewed with the right eye on the display, such that different images from each other may enter the left eye and the right eye.

Meanwhile, the HMD device 100 may be configured to track head movement of the user and immediately update visual images and provide 3D images as well as 2D images. For example, when the user wears the HMD device 100 on the head, the HMD device 100 completely seizing a control of a gaze of the user and provides 360 degree stereoscopic image and audio, and a gyro detection unit or an acceleration detection unit mounted on the HMD device 100 provides proper visual effects for a direction by sensing the user moving his/her head up and down or left and right.

Accordingly, the user may experience virtual reality (VR) as he/she is provided with 3D images present on a direction where the user lays his/her gaze among the panorama 3D images.

Figure 2A:
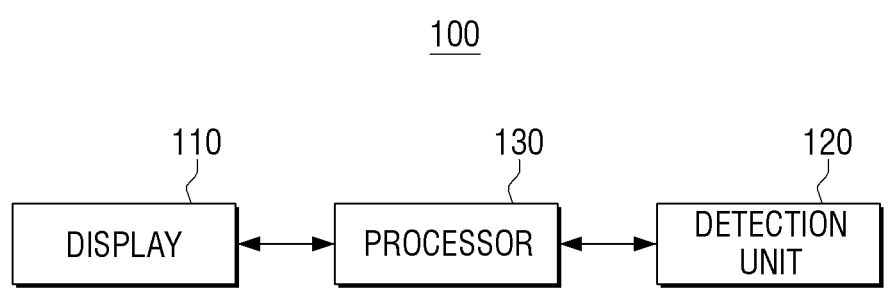
FIGS. 2A and 2B are block diagrams illustrating constitution of an HMD device according to an embodiment of the disclosure.
Figure 2B:
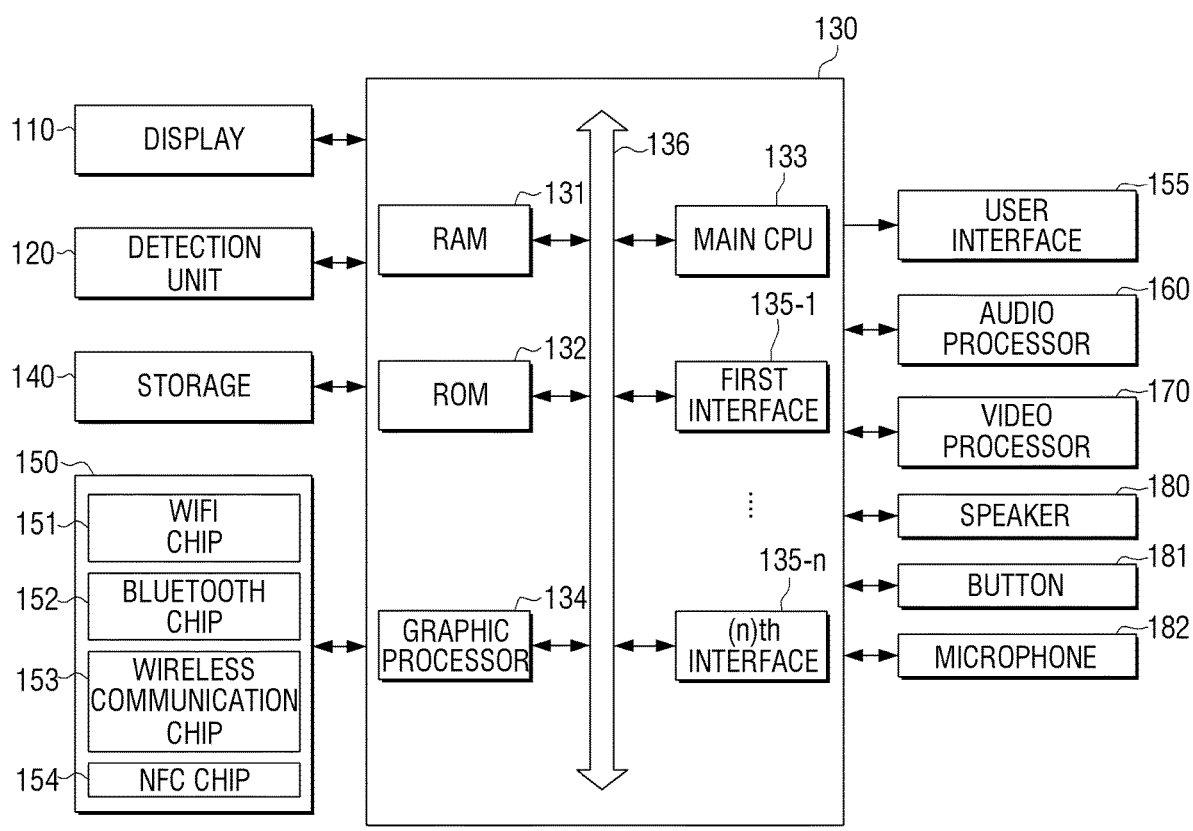

FIGS. 2A and 2B are block diagrams illustrating constitution of an HMD device 100 according to an embodiment of the disclosure.

Referring to FIG. 2A, the HMD device 100 includes a display 110, a detection unit 120 and a processor 130.

The display 110 may display content under the control of the processor 130. For example, the display 110 may display content stored in the HMD device 100 or received from another device. Further, the display 110 may overlay and display GUI or the like during playback of content.

The display 110 may change a screen state of a certain area of the display 110 under the control of the processor 130. For example, the display 110 may photograph external image and overlay it on the certain area of the display 100. Alternatively, the display 110 may increase transparency of the certain area of the display 110.

In this example, displaying the external image in an overlay form may involve adjusting an amount of flickering time of the overlaid external image and displaying a result. Further, changing the transparency may involve changing the transparency of the display 110.

Further, the display 110 may be implemented as liquid crystal display panel (LCD), organic light emitting diodes (OLED) or the like, although not limited hereto. Depending on cases, the display 110 may be implemented as a flexible display, a transparent display or the like.

The detection unit 120 may detect movement of an object in front of the HMD device 100. In this example, the detection unit 120 may mainly include a camera or an infrared detection unit. The camera is configured to photograph still images or videos. Specifically, the camera may be used to photograph an object positioned in front of the HMD device 100.

Further, when the detection unit 120 is provided with the infrared detection unit, the detection unit 120 may include a plurality of infrared detection units. A plurality of infrared detection units may be arranged in a row on an edge of the HMD device 100. A plurality of infrared detection units may determine approximate movement of an object positioned in front of the HMD device 100 according to presence/absence of the reflective wave.

Although the above describes that the detection unit 120 is provided with the camera or the infrared detection unit, embodiments may not be limited hereto. For example, the detection unit 120 may be provided with an ultrasound detection unit, a depth map or the like.

When movement of an object is detected, the processor 130 may change a screen state of the display 110 to provide an image in front of the HMD device 100 based on a location of the object. Accordingly, the processor 130 may naturally express any intended area of the content display screen and the external display screen.

Specifically, the detection unit 120 may include the camera, and the processor 130 may overlay and display an image of the images photographed by the camera that corresponds to the location where movement of an object is detected, upon an area corresponding to the display 110.

Further, when movement of the HMD device 100 is detected, the processor 130 may determine relative movement of an object with respect to movement of the HMD device 100, and change a screen state to provide front image of the HMD device 100 based on the relative movement of the object.

Meanwhile, when size of the detected object is greater than a preset size, the processor 130 may change a screen state to provide front image of the HMD device 100 based on a location of the object.

Further, when movement of the object is a user gesture in a preset form, the processor 130 may change a screen state to provide front image of the HMD device 100 based on the user gesture.

In this example, when user gesture directing toward a preset direction is detected, the processor 130 may change a screen state to provide front image of the HMD device 100. When user gesture directing toward an opposite direction is detected in the changed screen state, the processor 130 may change a screen state so as not to provide front image of the HMD device 100.

Meanwhile, the detection unit 120 may detect user gaze, and the processor 130 may change a screen state to maintain the changed screen state when user gaze is placed on the certain area of the display 110 in which a screen state has been changed, or not provide front image of the HMD device 100 when user gaze is outside the certain area of the display for which transparency is to be changed.

Meanwhile, the processor 130 may change transparency of the certain area of the display 110 based on a location of the object when movement of the object is detected.

For example, the processor 130 may increase transparency up to a maximum value in which case the user can only view outside of the HMD device 100. Alternatively, the processor 130 may change transparency to a medium value in which case the user can simultaneously view the outside of the HMD device 100 as well as the content.

Alternatively, the processor 130 may decrease transparency to have a minimum value in which case the user can only view content.

Further, the processor 130 may change transparency of the certain area of the display 110 based on current transparency of the certain area of the display 110 when movement of the object is detected.

Meanwhile, the HMD device 100 may further include a storage to store mapping information of an object in a preset form and corresponding movement, and the processor 130 may determine the certain area of the display 110 for which transparency is to be changed and degree of change in the transparency based on the mapping information.

FIG. 2B is a block diagram illustrating a detailed constitution of an HMD device 100 according to an embodiment. Referring to FIG. 2B, the HMD device 100 includes a display 110, a detection unit 120, a processor 130, a storage 140, a communicator 150, a user interface 155, an audio processor 160, a video processor 170, a speaker 180, a button 181, and a microphone 182. The constituent elements illustrated in FIG. 2B overlapping with those illustrated in FIG. 2A will not be redundantly described below.

The processor 130 may control the overall operation of the HMD device 100 using various programs stored in the storage 140.

Specifically, the processor 130 includes RAM 131, ROM 132, a main CPU 133, a graphic processor 134, first to (n)th interfaces (135-1 to 135-n), and a bus 136.

RAM 131, ROM 132, the main CPU 133, the graphic processor 134, and the first to (n)th interfaces 135-1 to 135-n may be connected to each other via the bus 136.

The first to (n)th interfaces 135-1 to 135-n may be connected to the various constituent elements described above. One of the interfaces may be a network interface connected to an external device through network.

The main CPU 133 may access the storage 140 and perform booting using O/S stored in the storage 140. Further, the main CPU 133 may perform various operations using various programs stored in the storage 140.

ROM 132 may store set of instructions for the system booting. When a turn-on command is inputted and power is supplied, the main CPU 133 may copy O/S stored in the storage 140 to RAM 131 according to the instructions stored in ROM 132, and boot the system by implementing O/S. When booting is completed, the main CPU 133 may copy various application programs stored in the storage 140 to RAM 131 and perform various operations by implementing the application programs copied to RAM 131.

The graphic processor 134 may generate screen including various objects such as icons, images, texts, or the like using an computing unit (not illustrated) and a renderer (not illustrated). The computing unit (not illustrated) may compute attribute values such as coordinate value, shape, size, color or the like in which each object is displayed according to layout of the screen based on the received control command. The renderer (not illustrated) may generate various layouts of the screen including object based on the attribute values computed at the computing unit (not illustrated). The screen generated at the renderer (not illustrated) may be displayed in a display area of the display 110.

Meanwhile, the above described operation of the processor 130 may be performed with the programs stored in the storage 140.

The storage 140 may store various data such as O/S (operating system) software module for driving the HMD device 100, various contents, display control module, object detect module, or the like.

In this case, the processor 130 may display content based on the information stored in the storage 140, and change transparency of the certain area of the display 110.

The communicator 150 is configured to perform communication with various types of external devices according to various types of communication methods. The communicator 150 includes WiFi chip 151, Bluetooth chip 152, wireless communication chip 153, NFC chip 154 or the like. The processor 130 may perform communication with various external devices using the communicator 150.

WiFi chip 151 and Bluetooth chip 152 may perform communication respectively according to WiFi method and Bluetooth method. When WiFi chip 151 or Bluetooth chip 152 is used, various pieces of connection information such as SSID, session key or the like may be first transmitted and received and communication is connected using the connection information, before transmission and reception of various pieces of. The wireless communication chip 153 refers to chip performing communication according to various communication standards such as IEEE, Zigbee, 3rd Generation (3G), 3rd Generation Partnership Project (3GPP), Long Term Evolution (LTE), or the like. NFC chip 154 refers to chip operating in Near Field Communication (NFC) method using 13.56 MHz bandwidth among various RF-ID frequency bandwidths such as 135 kHz, 13.56 MHz, 433 MHz, 860~960 MHz, 2.45 GHz, or the like.

Meanwhile, the communicator 150 may perform one-way communication or two-way communication with an electronic device. When the one-way communication is performed, the communicator 150 may receive signals from the electronic device. When the two-way communication is performed, the communicator 150 may receive signals from the electronic device, or transmit signals to the electronic device.

The user interface 155 may receive various user interactions. The user interface 155 may receive input of a keyboard, a mouse or the like. Alternatively, the user interface 155 may be implemented as a remote controller receiver receiving remote controller signals from a remote controlling device, a camera detecting user movement, a microphone receiving user voices, or the like.

Further, when the HMD device 100 is implemented as a touch-based electronic device, the user interface 155 may be implemented as a touch screen forming inter-layer structure with a touch pad. In this case, the user interface 155 may be used as the display 110 described above. Specifically, the user may control the HMD device 100 by touching an exterior of the display 110.

Meanwhile, the detection unit 120 includes a geomagnetic detection unit, a gyro detection unit, an acceleration detection unit, a proximity detection unit or the like. The detection unit 120 may detect various manipulations such as rotating, titling, pressing, approaching, or the like.

The geomagnetic detection unit is a detection unit to detect rotating state, moving direction or the like of the HMD device 100. The gyro detection unit is a detection unit to detect a rotating angle of the HMD device 100. The geomagnetic detection unit and the gyro detection unit may be both provided; however, the HMD device 100 may detect rotating state even if only one of them is provided.

The acceleration detection unit is a detection unit to detect a titling degree of the HMD device 100.

The proximity detection unit is a detection unit to detect approaching movement without directly contacting a surface of the display. The proximity detection unit may be implemented as various types of detection units such as high-frequency oscillating type forming high-frequency magnetic field and detecting electrical currents induced with magnetic field features which is varied at the time of object approaching, magnetic type using a magnet, and electrostatic capacity type detecting electrostatic capacity which is varied because of object approaching.

The audio processor 160 is a configured to perform processing with respect to audio data. The audio processor 160 may perform various processes such as decoding, amplifying, noise filtering or the like of the audio data.

The video processor 170 is a configured to perform processes with respect to video data. The video processor 170 may perform various image processes such as decoding, scaling, noise filtering, frame rate converting, resolution converting, or the like of the video data.

The speaker 180 is a configured to output various alarm sounds or voice messages as well as audio data processed in the audio processor 160.

The button 181 may be various forms of buttons such as mechanical button, touch pad, wheel or the like which are formed on a voluntary area of a front section, a side section, a rear side or the like of the exterior main body on the HMD device 100.

The microphone 182 is a configured to receive user voices or other sounds and convert it into audio data.

The following will describe basic constitution and various embodiments for understanding of the present disclosure.

Figure 3:
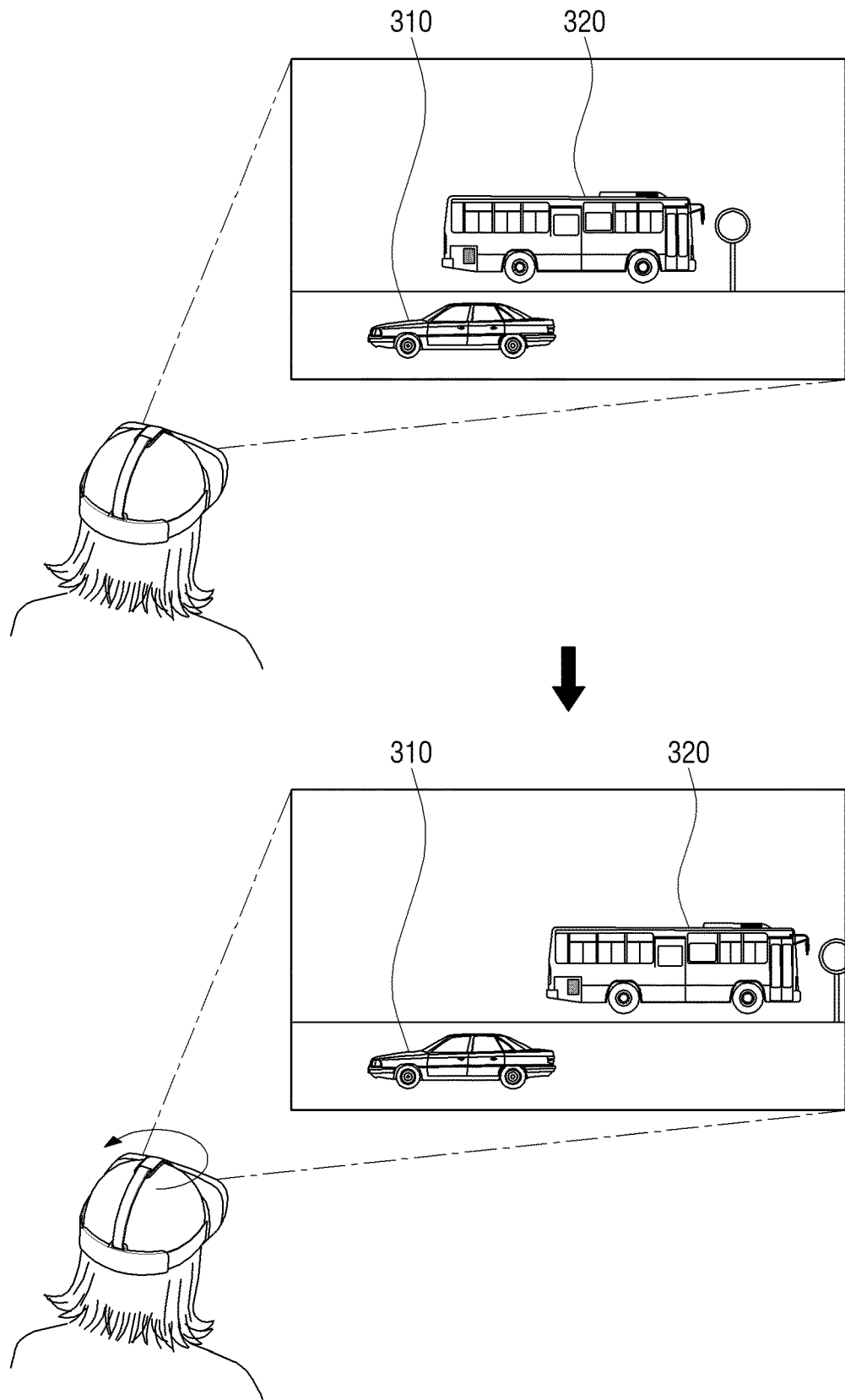
FIG. 3 is a diagram provided to describe a method for detecting movement of an object according to an embodiment of the disclosure.

FIG. 3 is a diagram provided to describe a method for detecting movement of the object according to an embodiment of the disclosure.

As illustrated in FIG. 3, the user may wear the HMD device 100 to experience virtual reality. The processor 130 may display content for the user experience of virtual reality and detect a front direction of the HMD device 100 through the detection unit 120. The processor 130 may detect a road, a car 310, a bus 320 or the like in front of the HMD device 100, but the scene illustrated in FIG. 3 may not be provided to the user. In other words, the scene of FIG. 3 is a scene detected by the detection unit 120, which is not viewed by the user unless transparency of the certain area of the display is changed according to movement of the object to be described below.

When movement of the object is detected, the processor 130 may change a screen state of the display 110 to provide front image of the HMD device 100 based on a location of an object. For example, as illustrated in an upper side drawing of FIG. 3, the processor 130 may display the user that the car 310 is moving, by changing a screen state of a certain area of the display 110 based on the detected location of the car 310 when detecting that the car 310 is moved toward a left direction.

In this example, the detection unit 120 may include the camera. Further, the processor 130 may overlay and display image corresponding to position where movement of the object is detected among images photographed by the camera on a corresponding area of the display 110.

For example, the processor 130 may overlay and display image of the area where the car 310 is moving toward a left side direction among the photographed images on a corresponding area of the display 110. The processor 130 may compare the entire area of the display 110 with the photographed image and determine a corresponding area of the display 110. For example, a left lower end of the photographed image may be also a left lower end on the display 110. Specifically, the processor 130 may compare size of the entire area of the display 110 with size of the photographed image and determine a corresponding area of the display 110 according to a proportional relation. Alternatively, when movement of the object is detected, the processor 130 may change transparency of a certain area of the display 110 based on a location of an object. For example, when detecting that the car 310 is moving toward a left side direction, the processor 130 may change the certain area of the display 110 to be transparent based on the detected location of the car 310 and display the user that the car 310 is moving.

Meanwhile, location of the car 310 may indicate relative position with the user rather than absolute position. That is, the processor 130 may change a screen state of the display 110 according to distance between the user and the car 310.

The processor 130 may determine relative movement of the object with respect to movement of the HMD device 100 when movement of the HMD device 100 is detected. For example, as illustrated in lower side diagram of FIG. 3, when the user moves his head toward a left side, the detection unit 120 may detect that the car 310, the bus 320 or the like in front of the HMD device 100 is moved in a right side. In this case, the processor 130 may determine that the HMD device 100 is moved and determine actual movement of an object. That is, the processor 130 may ignore movement of the object according to movement of the HMD device 100 and determine actual movement of the object to be effective movement only.

The processor 130 may determine movement of the HMD device 100 using the geomagnetic detection unit, the gyro detection unit, the acceleration detection unit, the proximity detection unit or the like which are described above.

Alternatively, the processor 130 may detect actual movement of the object only in terms of software. For example, the processor 130 may determine that the HMD device 100 is moved when the detected area is entirely moved, and that the object is moved when a portion of the detected area is moved.

Alternatively, when moving speed of some object is different from moving speed of the entire area while the detected area is entirely moved, the processor 130 may determine that the HMD device 100 is moved and that some object is moved relatively with respect to the movement of the HMD device 100.

A lower side diagram of FIG. 3 illustrates that only the car 310 is actually moving, while the processor 130 may determine that the HMD device 100 is moved and that the car 310 is moved relatively with respect to movement of the HMD device 100, as described above.

The processor 130 may change a screen state to provide front image of the HMD device 100 based on relative movement of an object. For example, as illustrated in FIG. 3, the processor 130 may change a screen state of a lower area of the display 110 based on the detected location of the car 310 when determining that the car 310 is moved in a left side.

Meanwhile, although FIG. 3 illustrates that the car 310 is moved to the left side, the processor 130 may detect that the car 310 is moved in another direction.

Specifically, the processor 130 may detect that the car 310 is approaching toward the user. For example, the processor 130 may change a screen state of a certain area of the display 110 upon detecting that the car 310 is increased in size. That is, the processor 130 may determine size of an area occupied by the detected car 310 from the entire detection area and determine the movement of the car 310.

Figure 4A:
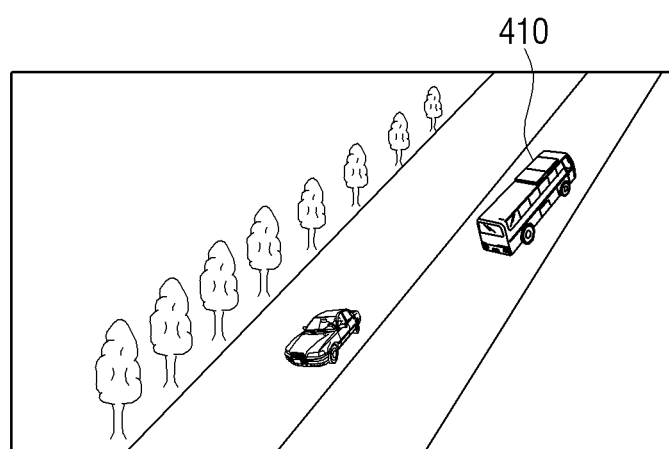
FIGS. 4A, 4B, and 4C are diagrams provided to describe an operation according to size of an object, according to an embodiment of the disclosure.
Figure 4B:
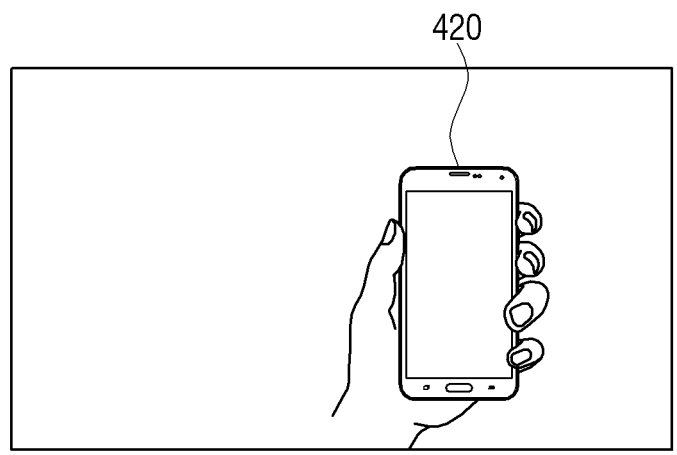
Figure 4C:
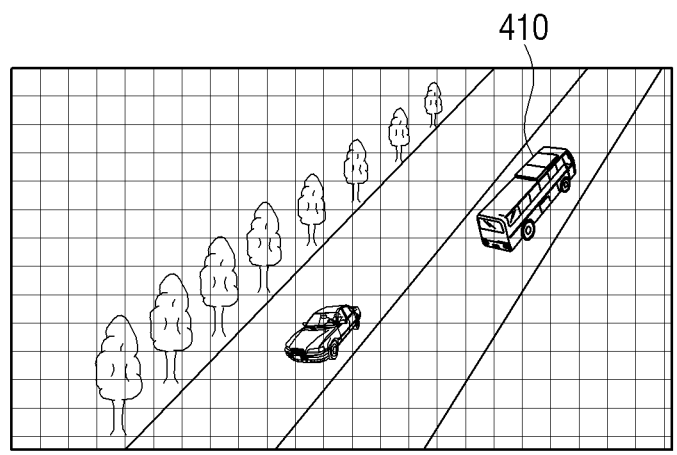

FIGS. 4A to 4C are diagrams provided to describe an operation according to size of an object, according to an embodiment of the disclosure.

As illustrated in FIG. 4A, when size of the detected object is greater than a preset size, the processor 130 may change a screen state to provide front image of the HMD device 100 based on a location of an object. For example, the processor 130 may detect that the bus 410 is moving away upon detecting front direction of the HMD device 100. However, when determining that the bus 410 is less than a preset size because of the remote distance to the bus 410, the processor 130 may not change a screen state of a certain area of the display 110.

However, as illustrated in FIG. 4B, with the device is a smart phone 420 having a considerably smaller size than the bus 410, when a distance from the HMD device 100 is near, the processor 130 may change a screen state of a certain area of the display 110 based on a location of the smart phone 420. That is, when determining that the detected smart phone 420 is greater than a preset size, the processor 130 may change a screen state of a certain area of the display 110 corresponding to location of the smart phone 420, in which case the user can view the smart phone 420.

The processor 130 may compare the size of the detected object with a preset size. For example, as illustrated in FIG. 4C, the processor 130 may divide the entire detection area into a grid form and determine whether size of the detected object is greater than a preset size based on the number of grid cells occupied by the moving object.

However, embodiments may not be limited hereto, and accordingly, the number of grid cells may be varied. For example, the grid cells may be denser than that illustrated in FIG. 4C. Meanwhile, a reference number of grid cells may be established by the user.

Figure 5A:
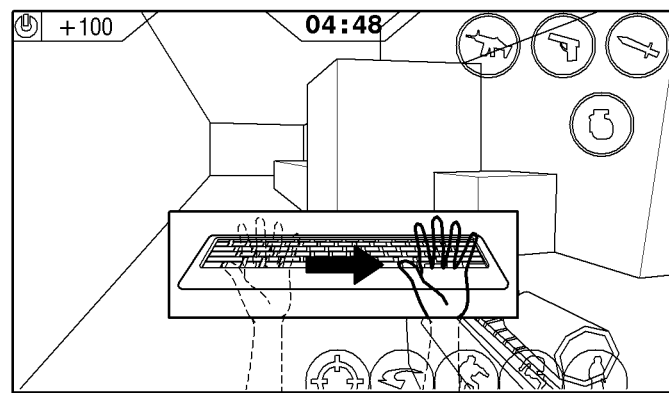
FIGS. 5A, 5B, and 5C are diagrams provided to describe an operation according to form of user gesture, according to an embodiment of the disclosure.
Figure 5B:
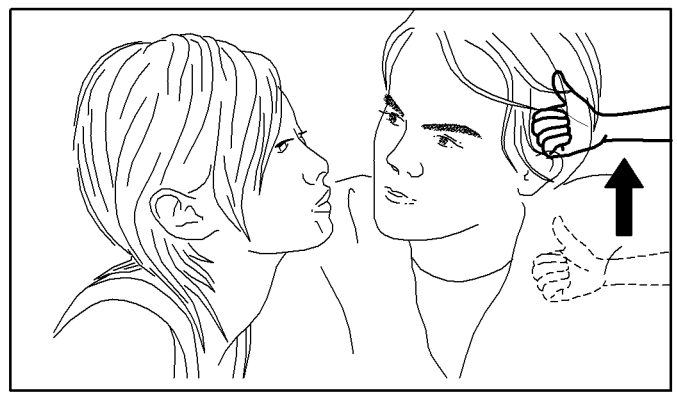
Figure 5C:
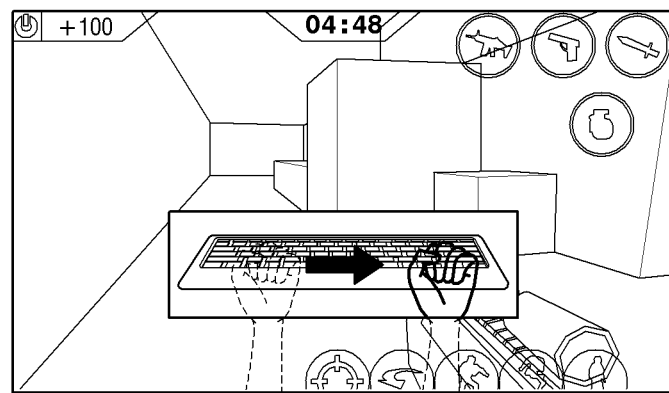

FIGS. 5A to 5C are diagrams provided to describe an operation according to form of user gesture, according to an embodiment of the disclosure.

As illustrated in FIG. 5A, when movement of the object is a user gesture in a preset form, the processor 130 may change a screen state to provide front image of the HMD device 100 based on the user gesture. For example, the processor 130 may change a screen state of a certain area of the display 110 corresponding to the detected position where the user's hand is moved according to the gesture of moving the user's hand from a left side to a right side.

FIG. 5A illustrates images actually provided to the user who is experiencing virtual reality. That is, the processor 130 may change a screen state of a certain area of the display 110 according to user gesture while providing shooting game screen to the user, such that the user can view his hand and a keyboard in front of the HMD device 100. As described above, the processor 130 may provide front image by overlaying and displaying the photographed image or changing transparency of the display 110, thus allowing the user to control the keyboard.

Meanwhile, as illustrated in FIG. 5B, the processor 130 may control preset functions when movement of the object is a user gesture in a preset form. For example, the processor 130 may change to movie content from the shooting game screen and display according to the gesture of moving the user's hand from a lower side to an upper side of the entire detection area.

The processor 130 may perform another function based on an area where movement of the object is performed in the entire detection area. For example, as illustrated in FIG. 5B, the processor 130 may change to movie content from the shooting game screen and display according to the gesture of moving the user's hand from a lower side to an upper side on a right side of the entire detection area. Alternatively, the processor 130 may increase volume of sound of the shooting game screen according to the gesture of moving the user's hand from a lower side to an upper side on a left side of the entire detection area.

The processor 130 may perform another function based on a moving direction of an object. For example, the processor 130 may change to movie content from the shooting game screen and display according to the gesture of moving the user's hand from a lower side to an upper side. Alternatively, the processor 130 may change the entire area of the display 110 to be transparent according to the gesture of moving the user's hand from an upper side to a lower side.

Meanwhile, as illustrated in FIG. 5C, the processor 130 may change a screen state of a certain area of the display 110 by considering shape of an object. For example, the processor 130 may change a screen state of a certain area of the display 110 according to the gesture of clenching a first and moving from a left side to a right side. In this case, the processor 130 may not perform any operation when the user does not clench a fist.

The processor 130 may change a screen state of a certain area of the display 110 by considering at least one of: form of an object; an area of the entire detection area where the movement of the object is performed; and a moving direction of an object.

Meanwhile, the HMD device 100 may further include the storage 140 to store mapping information with respect to an object in a preset form and corresponding movement. Such mapping information may be established initially when the HMD device 100 is manufactured, although it may be inputted by the user.

The processor 130 may determine a certain area of the display 110 for which transparency is to be changed and degree of change in the transparency based on the mapping information. For example, the processor 130 may determine degree of change in the transparency based on the number of detected user fingers.

Figure 6A:
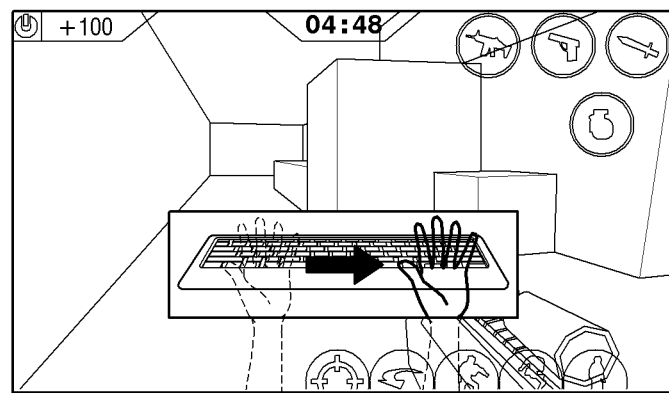
FIGS. 6A and 6B are diagrams provided to describe a method for changing a screen state according to an embodiment of the disclosure.
Figure 6B:
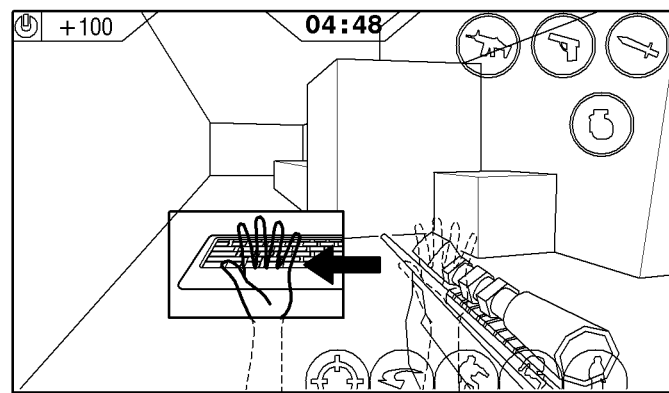

FIGS. 6A and 6B are diagrams provided to describe a method for changing a screen state according to an embodiment.

As illustrated in FIG. 6A, the processor 130 may change a screen state to provide front images of the HMD device 100 when the user gesture directing toward a preset direction is detected. As described above, the processor 130 may change a screen state of a certain area of the display 110 corresponding to a location where movement of the user's hand is detected according to the gesture of moving the user's hand from a left side to a right side.

FIG. 6B illustrates a method for changing a screen state again after a screen state has been changed as in FIG. 6A. When the user gesture directing toward an opposite direction is detected in the changed screen state, the processor 130 may change a screen state so as not to provide front images of the HMD device 100. In this example, the 'opposite direction' refers to a direction opposite to a preset direction of the gesture of changing an initial screen state.

FIGS. 6A and 6B are merely one of embodiments, and the present disclosure is not limited hereto. For example, when the palm is detected, the processor 130 may change a screen state of a certain area of the display 110 to provide image of an area where the palm goes through according to movement of the palm. When the first is detected, the processor 130 may change a screen state of a certain area of the display 110 so as not to provide image of the area where the first has passed according to movement of the fist.

Alternatively, the processor 130 may distinguish the right hand and the left hand and determine whether to provide front image.

Figure 7A:
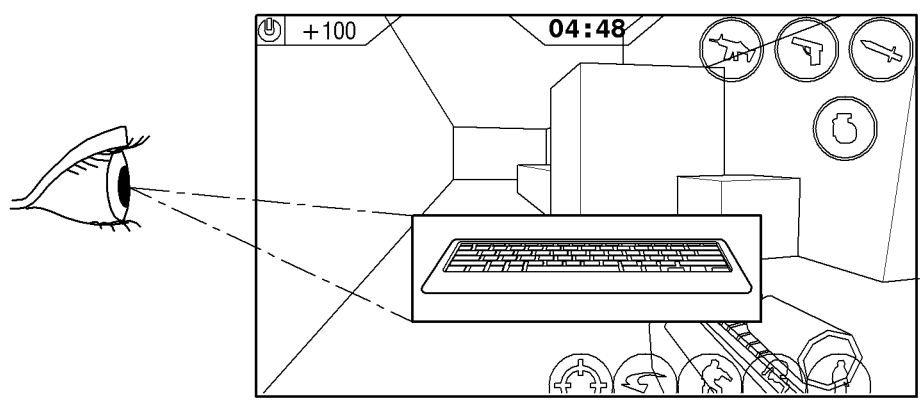
FIGS. 7A and 7B are diagrams provided to describe an operation according to user gaze, according to an embodiment of the disclosure.
Figure 7B:
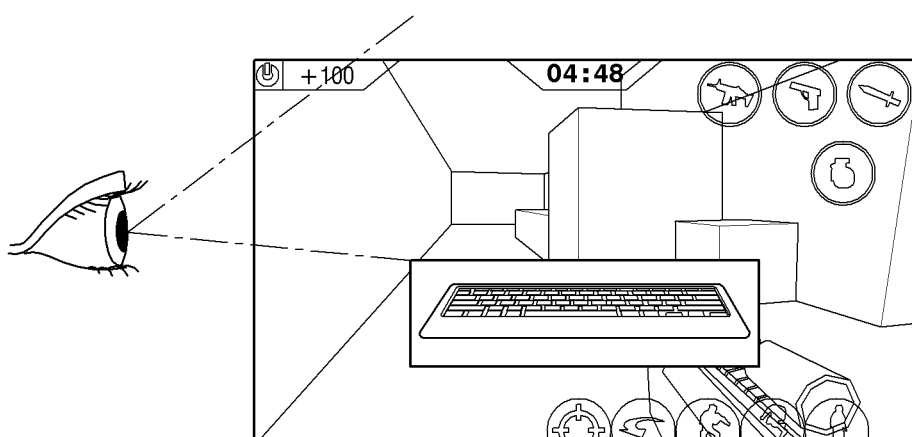
Figure 7B:
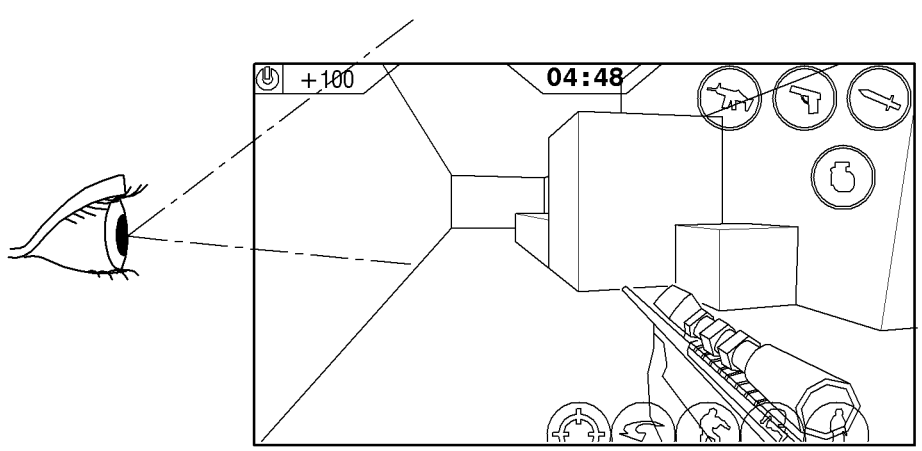

FIGS. 7A and 7B are diagrams provided to describe an operation according to gaze of the user, according to an embodiment.

The detection unit 120 of the HMD device 100 may detect gaze of the user. For example, the detection unit 120 may include a camera photographing gaze of the user as well as a camera photographing a front direction of the HMD device 100. However, embodiments may not be limited hereto, and accordingly, any device that can detect gaze of the user may be used as the detection unit 120.

As illustrated in FIG. 7A, the processor 130 may maintain the changed screen state when gaze of the user is placed on a certain area of the display 110 in which a screen state has been changed. Accordingly, the user may view a keyboard in front of the HMD device 100 continuously.

Meanwhile, as illustrated in FIG. 7B, the processor 130 may change a screen state so as not to provide front image of the HMD device 100 when gaze of the user is outside the certain area of the display 110 in which a screen state has been changed. That is, the user may change location of gaze and view the shooting game screen again.

However, embodiments may not be limited hereto, and accordingly, the processor 130 may change a screen state so as not to provide front image of the HMD device 100 only when gaze of the user is outside the certain area of the display 110 in which a screen state has been changed for greater than a preset time.

Further, the processor 130 may gradually change a screen state when gaze of the user is outside the certain area of the display 110 in which a screen state has been changed. For example, the processor 130 may gradually decrease transparency of the overlaid front image or gradually decrease transparency of the display 110.

The processor 130 may maintain a screen state at a time point of gazing when gaze of the user again directs toward the certain area of the display 110 in which a screen state has been changed while gradually changing a screen state. Further, when gaze of the user is maintained for greater than a preset time while a screen state is kept, the processor 130 may change a screen state to provide front image of the HMD device 100 again.

Figure 8A:
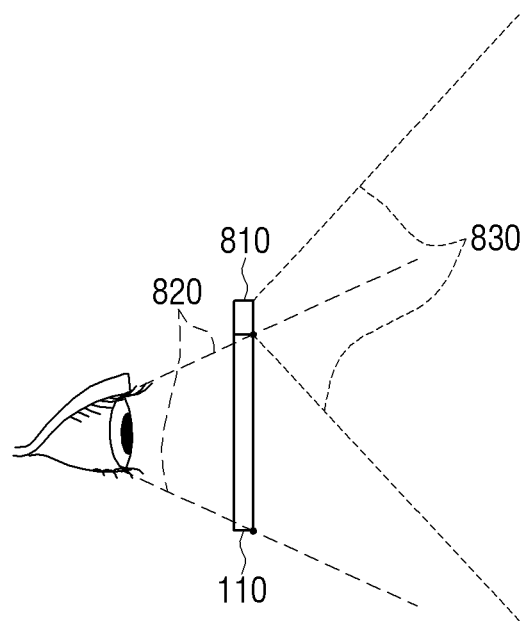
FIGS. 8A, 8B, and 8C are diagrams provided to describe a method for establishing the entire detection area, according to an embodiment of the disclosure.
Figure 8B:
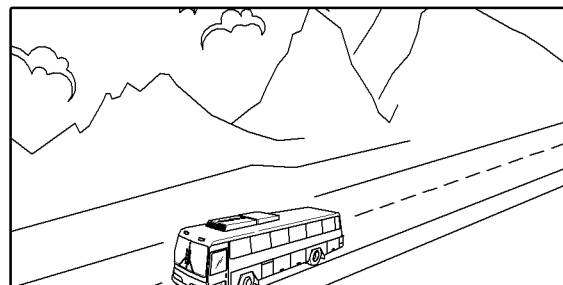

FIGS. 8A to 8B are diagrams provided to describe a method for establishing the entire detection area, according to an embodiment.

As illustrated in FIG. 8A, the detection unit 120 of the HMD device 100 may include a camera 810. Further, a viewing angle 820 of the user may be different from a viewing angle 830 of the camera 810.

In this example, the viewing angle 820 of the user refers to an angle in which the user can view a front direction of the HMD device 100 through the display 110 under the condition in which the display 110 is transparent. The viewing angle 830 of the camera 810 indicates a viewing of a scene that can be captured by the camera 810, which may be implemented as various viewing angles 830. However, the following will explain that the viewing angle 830 of the camera 810 is broader than or same as the viewing angle 820 of the user.

Figure 8C:
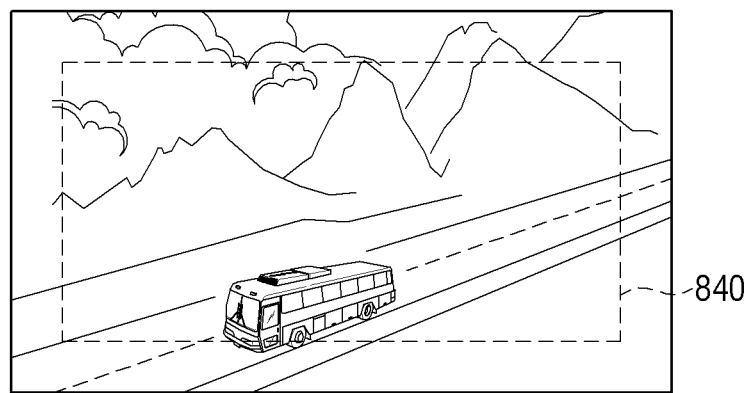

A case in which the viewing angle 830 of the camera 810 is broader than the viewing angle 820 of the user will be first described. FIG. 8B illustrates a scene viewed by the user based on the viewing angle 820 of the user, and FIG. 8C illustrates a scene photographed based on the viewing angle 830 of the camera 810.

The processor 130 may detect movement of the object within an area corresponding to gaze of the user among the areas photographed by the camera 810 and change a screen state of a certain area of the display based on a location of an object. That is, because a scene photographed based on the viewing angle 830 of the camera 810 is broader, the processor 130 may determine only the movement of the object within an area 840 that corresponds to the scene viewed by the user to be a meaningful movement.

Meanwhile, when the viewing angle 830 of the camera 810 is same as the viewing angle 820 of the user, the processor 130 may detect movement of the object within an area corresponding to gaze of the user among the areas photographed by the camera 810. The above operation may reduce errors between the area actually viewed by the user and the area photographed by the camera 810.

Further, the processor 130 may determine a certain area of the display 110 in which a screen state has been changed based on at least one of location of the object and the viewing angle of the user determined by the display 110.

Figure 9:
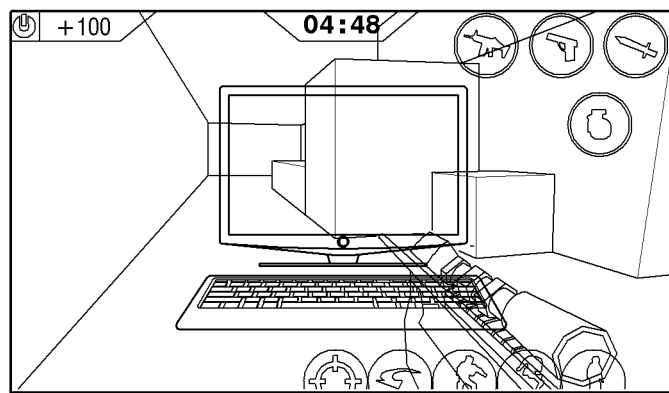
FIG. 9 is a diagram provided to describe an operation according to current transparency of a display according to an embodiment of the disclosure.

FIG. 9 is a diagram provided to describe operation at current transparency of a display according to an embodiment of the disclosure.

As illustrated in FIG. 9, when movement of the object is detected, the processor 130 may change transparency of a certain area of the display 110 based on current transparency of the certain area of the display 110. For example, when transparency of the certain area of the display 110 is 60% and when movement of the object is detected, the processor 130 may reduce transparency of the certain area of the display 110. Alternatively, when transparency of the certain area of the display 110 is 40% and when movement of the object is detected, the processor 130 may decrease transparency of the certain area of the display 110. That is, the processor 130 may change transparency of the certain area of the display 110 to be completely transparent or completely non-transparent, and in this example, determine how to change based on current transparency.

Alternatively, the processor 130 may change transparency of the certain area of the display 110 by considering at least one of current transparency of the certain area of the display 110, shape of an object, an area where movement of the object is performed in the entire detection area, and direction of the movement of an object.

FIG. 10 is a flowchart provided to describe a method for controlling an HMD device according to an embodiment of the disclosure.

First, content may be displayed on the display at S1010. Further, movement of the object in front of the HMD device may be detected at S1020. When movement of the object is detected, a screen state of the display may be changed to provide front image of the HMD device based on a location of the object at S1030.

Specifically, the changing at S1030 may overlay and display image corresponding to position where movement of the object is detected among the images photographed by the camera on an area corresponding to the display.

In this example, when movement of the HMD device is detected, the changing at S1030 may include the determining relative movement of the object with respect to movement of the HMD device and the changing a screen state to provide front image of the HMD device based on the relative movement of an object.

Alternatively, the changing at S1030 may change a screen state to provide front image of the HMD device based on a location of the object when the detected size of the object is greater than a preset size.

Further, the changing at S1030 may change a screen state to provide front image of the HMD device based on the user gesture when movement of the object is a user gesture in a preset form.

Alternatively, the changing at S1030 may include the changing a screen state to provide front image of the HMD device when user gesture directing toward a preset direction is detected, and the changing a screen state so as not to provide front image of the HMD device when user gesture directing toward an opposite direction is detected in the changed screen state.

Meanwhile, a screen state may be maintained when gaze of the user is detected to be placed on the certain area of the display in which a screen state has been changed, and a screen state may be changed so as not to provide front image of the HMD device when gaze of the user is outside the certain area of the display.

Meanwhile, the changing at S1030 may change transparency of the certain area of the display based on a location of the object when movement of the object is detected.

Alternatively, the changing at S1030 may change transparency of the certain area of the display based on current transparency of the certain area of the display when movement of the object is detected.

Further, the changing at S1030 may determine the certain area of the display for which transparency is to be changed and degree of change in the transparency based on mapping information of an object in a preset form and corresponding movement.

According to the various embodiments described above, the user may view a front direction of the HMD device by changing transparency of the certain area of the display provided in the HMD device according to movement of the object in front of the HMD device.

Meanwhile, although the above describes that transparency is changed based on movement of the object in front of the HMD device, it may not be limited hereto. For example, transparency of the display may be changed on the basis of user voice recognition.

Meanwhile, the control method of the HMD device according to the various embodiments described above may be implemented as program codes that can be executed in a computer and provided to each server or device to be executed by a processor while being stored in various non-transitory computer readable recording media.

For example, there may be provided non-transitory computer readable recording medium storing a program sequentially performing the displaying content on the display, the detecting movement of the object in front of the HMD device, and the changing a screen state of the display to provide front image of the HMD device based on a location of the object when movement of the object is detected.

The non-transitory computer readable recording medium refers to medium that store data semi-permanently and being read by a machine, rather than medium that store data temporarily such as register, cache, memory or the like. Specifically, the above various applications or programs may be stored and provided in non-transitory computer readable recording medium such as CD, DVD, hard disk, Blu-ray disk, USB, memory card, ROM or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

We claim:

1. A head mounted display (HMD) device, comprising:
   a display;
   a detector; and
   a processor configured to:
      control the display to display content,
      based on an object in front of the HMD device being detected by the detector, identify a size of the object, and
      based on the size of the object being greater than a preset size, control the display to change a screen state of the display to provide a front image of the HMD device.

2. The HMD device of claim 1, wherein the detector further comprises a camera, and
   wherein the processor is configured to control the display to overlay and display an image among images photographed by the camera that corresponds to a location at which the object is detected, on a corresponding area of the display.

3. The HMD device of claim 1, wherein the processor is configured to obtain relative movement of the object with respect to movement of the HMD device based on movement of the HMD device being detected, and control the display to change the screen state to provide the front image of the HMD device based on the relative movement of the object.

4. The HMD device of claim 1, wherein the processor is configured to, based on a user gesture in a preset form being detected, control the display to change the screen state to provide the front image of the HMD device.

5. The HMD device of claim 4, wherein the processor is configured to, based on a user gesture directed toward a preset direction being detected, control the display to change the screen state to provide the front image of the HMD device, and based on a user gesture directed toward an opposite direction being detected in the changed screen state, control the display to change the screen state so as not to provide the front image of the HMD device.

6. The HMD device of claim 1, wherein the detector is configured to detect a user gaze, and
   wherein the processor is configured to maintain the changed screen state based on the user gaze being detected to be on a certain area of the display in which the screen state has been changed, and control the display to change the screen state so as not to provide the front image of the HMD device based on the user gaze being outside the certain area of the display.

7. The HMD device of claim 1, wherein the processor is configured to control the display to change transparency of a certain area of the display based on a location of the object.

8. The HMD device of claim 7, wherein the processor is configured to control the display to change transparency of the certain area of the display based on current transparency of the certain area of the display.

9. The HMD device of claim 7, wherein the processor is configured to obtain the certain area of the display for which transparency is to be changed and degree of change in the transparency based on a form of the object.

10. A method for controlling a head mounted display (HMD) device, comprising:
    displaying content on a display of the HMD device;
    based on an object in front of the HMD device being detected, identifying a size of the object; and
    based on the size of the object being greater than a preset size, changing a screen state of the display to provide a front image of the HMD device.

11. The method of claim 10, wherein the changing comprises overlaying and displaying an image among images photographed by the camera that corresponds to a location at which the object is detected, on a corresponding area of the display.

12. The method of claim 10, wherein the changing comprises:
obtaining relative movement of the object with respect to movement of the HMD device based on movement of the HMD device being detected; and
changing the screen state to provide the front image of the HMD device based on the relative movement of the object.

13. The method of claim 10, wherein the changing comprises, based on a user gesture in a preset form being detected, changing the screen state to provide the front image of the HMD device.

14. The method of claim 13, wherein the changing comprises, based on a user gesture directed toward a preset direction being detected, changing the screen state to provide the front image of the HMD device, and
the method further comprising:
based on a user gesture directed toward an opposite direction being detected in the changed screen state, changing the screen state so as not to provide the front image of the HMD device.

15. The method of claim 10, further comprising:
detecting a user gaze, and
maintaining the changed screen state based on the user gaze being detected to be on a certain area of the display in which the screen state has been changed, and changing the screen state so as not to provide the front image of the HMD device based on the user gaze being outside the certain area of the display.

16. The method of claim 10, wherein the changing comprises changing transparency of a certain area of the display based on a location of the object.

17. The method of claim 16, wherein the changing comprises changing transparency of the certain area of the display based on current transparency of the certain area of the display.

18. The method of claim 16, wherein the changing comprises obtaining the certain area of the display for which transparency is to be changed and degree of change in the transparency based on a form of the object.

* * * * *